US005460255A

United States Patent [19]

Quigley

[11] Patent Number: 5,460,255

[45] Date of Patent: Oct. 24, 1995

[54] UNIVERSAL SEGMENTED FRICTION CLUTCH FACING

[75] Inventor: James R. Quigley, Lombard, Ill.

[73] Assignee: Borg-Warner Automotive, Inc., Sterling Heights, Mich.

[21] Appl. No.: 37,569

[22] Filed: Mar. 25, 1993

[51] Int. Cl.[6] ..................... F16D 13/60

[52] U.S. Cl. ..................... 192/113.36; 192/70.12; 192/70.14; 192/107 R; 188/264 D

[58] Field of Search ..................... 192/70.12, 70.14, 192/107 R, 113 LC, 113 BG; 188/264 D, 264 E

[56] References Cited

U.S. PATENT DOCUMENTS

| | | | |
|---|---|---|---|
| 2,330,856 | 10/1943 | Adamson | 192/6 B |
| 2,690,248 | 9/1954 | McDowall | 192/113 |
| 2,850,118 | 9/1958 | Byers | 188/71 |
| 3,042,168 | 7/1962 | Binder | 192/107 |
| 3,094,194 | 6/1963 | Kershner | 188/72 |
| 3,198,295 | 8/1965 | Fangman et al. | 188/264 |
| 3,249,189 | 5/1966 | Schjolin et al. | 192/113 BG X |
| 3,250,349 | 5/1966 | Byrnes et al. | 188/218 |
| 3,347,345 | 10/1967 | Rogers et al. | 192/113 BG X |
| 3,412,831 | 11/1968 | Marcheron | 188/218 |
| 3,412,836 | 11/1968 | Wilmer | 192/107 |
| 3,491,865 | 1/1970 | Stockton | 192/70.14 |
| 3,534,842 | 10/1970 | Davison, Jr. | 192/113 |
| 3,730,320 | 1/1973 | Freeder et al. | 192/107 M |
| 3,871,934 | 3/1975 | Marin | 156/94 |
| 3,885,659 | 5/1975 | Smith | 192/107 R |
| 3,927,241 | 12/1975 | Augustin | 408/42 B |
| 3,937,303 | 2/1976 | Allen et al. | 188/73.2 |
| 4,027,758 | 6/1977 | Gustavsson et al. | 192/113 B |
| 4,139,085 | 2/1979 | Kanbe et al. | 192/197 R |
| 4,260,047 | 4/1981 | Nels | 192/70.12 |
| 4,396,100 | 8/1983 | Eltze | 192/70.12 |
| 4,449,621 | 5/1984 | Geppert | 192/70.13 |
| 4,674,616 | 6/1987 | Mannino, Jr. | 192/107 R |
| 4,726,455 | 2/1988 | East | 192/107 R |
| 4,878,282 | 11/1989 | Bauer | 29/194.5 |
| 4,913,267 | 4/1990 | Campbell et al. | 188/218 |
| 4,941,539 | 7/1990 | Ishikawa et al. | 192/107 R |
| 4,995,500 | 2/1991 | Payvar | 192/107 R |
| 5,094,331 | 3/1992 | Fujimoto et al. | 192/70.12 |
| 5,101,953 | 4/1992 | Payvar | 192/107 R |
| 5,226,516 | 7/1993 | Novikoff et al. | 192/70.12 X |

FOREIGN PATENT DOCUMENTS

| | | | |
|---|---|---|---|
| 0267027 | 1/1988 | European Pat. Off. | F16D 13/64 |
| 20441042 | 2/1971 | France | F16D 13/00 |
| 3722031 | 1/1989 | Germany | F16D 65/12 |

OTHER PUBLICATIONS

Patent Abstracts of Japan; vol. 12 No. 306(C–522) 19 Aug. 1988 & JP–A–63077944 (FCC) 8 Apr. 1988.

"British Motor Cycles Since 1950", vol. 2, p. 188—Norton Motors Ltd Clutch.

*Primary Examiner*—Andrea L. Pitts
*Attorney, Agent, or Firm*—Emch, Schaffer, Schaub et al.; Greg Dziegielewski

[57] ABSTRACT

A wet-type friction clutch having universally shaped friction segments manufactured from a nearly scrapless process. Relative juxtaposition of the segments will achieved desired amounts of cooling fluid flow into and out of the friction discs with corresponding desired levels of hydrostatic pressure buildup between the discs.

4 Claims, 4 Drawing Sheets

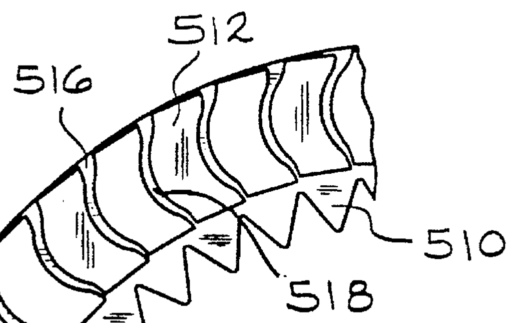
FIG. 5
612
616
610
FIG. 6
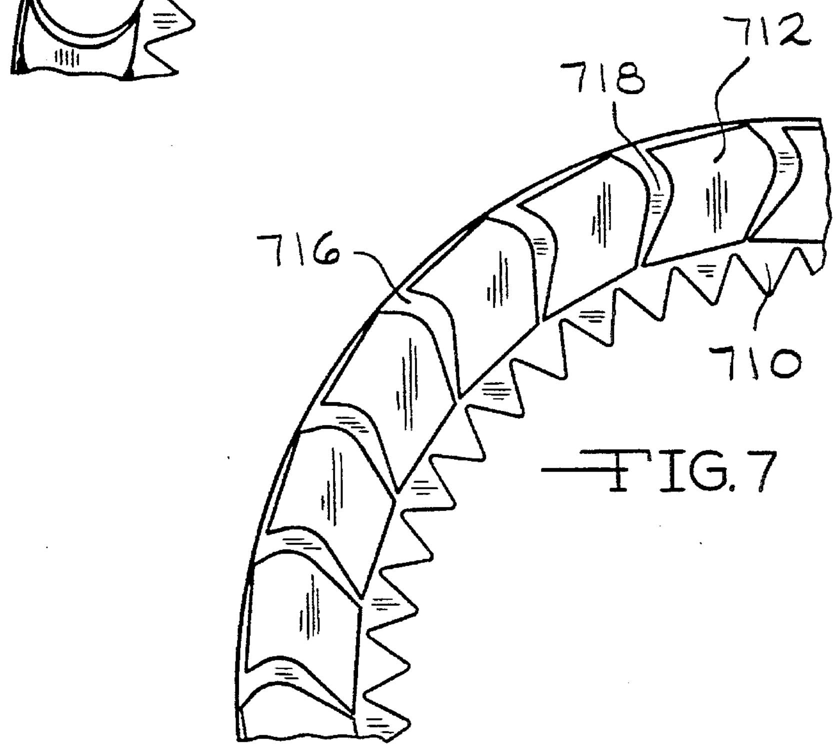
FIG. 7

UNIVERSAL SEGMENTED FRICTION CLUTCH FACING

BACKGROUND ART

The present invention relates to a friction clutch facing for use with a wet-type multi-plate clutch. Such multi-plate clutches generally comprise a plurality of interleaved clutch discs and clutch plates which engage to provide the transmission of energy from a drive engine to a drive wheel. Wet-type clutches also utilize a lubricant such as oil to reduce clutch wear, cool the friction facings of the clutch discs and provide desired hydrostatic forces between the clutch plates and clutch discs.

In the interest of optimizing clutch life, operational smoothness, and cooling efficiency for the friction facings, the literature and art relating to wet-type clutches evidences numerous clutch designs producing a large variety of friction facing materials and designs of friction facing materials. A common friction facing, currently available is typified by the disclosure of U.S. Pat. Nos. 4,260,047 and 4,674,616. Both patents disclose friction discs, for use with clutches, which are formed from friction material and produced from the joinder of a plurality of arcuate segments. Commonly, the arcuate segments are pre-grooved to allow for cooling oil to flow over the friction facing during clutch operation. Further, the arcuate segments are designed to interlock together to form an annular friction facing intended to be bonded to an annular core plate.

The creation and design of arcuate segment friction facings is intended to meet a goal of reducing the amount of waste produced during the manufacture of the friction facings. The friction facings are usually composed of sintered metal or paper which normally is impregnated with a phenolic resin. The friction facing segments are commonly cut from a continuous strip of rectangular sheeting composed of the friction material which is fed through the die or cutting apparatus. The friction material is relatively expensive and, therefore, it is desirable to optimize the elimination of waste from the manufacturing process. Further, elimination of waste product from the manufacture process assists in meeting compliance standards, for the proper disposal of any scrap, which are the focus of increasing regulation by current environmental regulations. Any scrap resulting from the cutting process must be disposed of in an appropriate manner and, because of the materials from which the friction facing is manufactured, this disposal is becoming increasingly costly. It is, therefore, a primary objective of the invention to effectively reduce the amount of scrap remaining after cutting of the friction facing segments. Of course, the most desirable objective for an improved method of manufacturing friction facing segments would be to produce a scrapless manufacturing process which uses nearly 100% of the available material, with little or no waste.

An ongoing objective for wet-type multiple clutch discs involves the provision of sufficient cooling and lubrication to the friction facings and clutch plates so that smooth engagement and disengagement of the clutch is maintained without creating excessive wear on the members of the clutch and friction facings. Many prior art friction facing designs incorporate the use of grooves or slot patterns within the facing material to achieve the desired cooling and lubrication by allowing the passage of a fluid such as oil through the friction facings. Such cooling grooves are generally produced from one of three methods. One method provides that the friction material is pre-grooved prior to being cut and applied to the clutch plate in a manner such as that taught by U.S. Pat. No. 4,260,047. Another method of producing grooves utilizes configured tooling to compress portions of the friction material during the hot pressure bonding process. The third and most preferred method involves producing cut grooves in a finished friction plate by mounting the plate into a fixture and passing a multiple gang of milling and grinding wheels through the friction material to cut distinct grooves of desired depth and definition.

It is an objective of the present invention to manufacture a friction clutch plate having distinct cooling groove patterns of desired depth and definition without the need for secondary operations and attendant machinery.

U.S. Pat. No. 5,094,331 discloses a variety of friction facing structures which are intended to distribute oil during operation of the clutch so as to remove frictional heat generated by the interaction of the friction facings and the clutch plates and also serve to absorb shocks produced when the clutch disc with friction facing and companion clutch plates are engaged and disengaged. The embodiments disclosed in the '331 patent provide for structures which have frictional surfaces spaced at predetermined intervals thereby creating oil passages having a width that becomes progressively smaller in a radial direction away from the center of the clutch disc to an outer circumferential edge of the clutch disc. These radial oil passages allow the oil to flow through the oil passages or grooves under centrifugal forces to cool the clutch discs and clutch plates even while the clutch discs and clutch plates are engaged. One embodiment described in the '331 patent provides for distinct oil passages and oil grooves being alternately defined in the frictional surface of the friction facing. The oil passages and oil grooves are constructed such that a large amount of oil will flow through the passages for a cooling effect and a large amount of oil will also be retained in the oil grooves. Consequently, the clutch discs can be cooled effectively and the clutch can also be smoothly engaged and disengaged since the oil retained in the oil grooves will exert a hydrostatic force to the clutch discs and the clutch plates as a result of the centrifugal forces acting on the clutch members. While friction facings of this design are effective in meeting their objectives, they are complex in design, often resulting in production difficulties due to the variety of grooves and passages provided within the facing material. The complexity of the designs of the '331 friction facing also leads to problems with scrap disposal. Therefore, it is desirable to improve upon the friction facings disclosed in the '331 patent by reducing the complexities of manufacture and continuing to strive toward the elimination of scrap.

Another embodiment of friction facings disclosed in the '331 patent discloses the use of a plurality of friction members attached to the opposing surfaces of the disc plate to define a plurality of oil passages extending radially outward from the inner peripheral edge to the outer peripheral edge of the clutch disc. Generally the oil passages have a width which becomes progressively smaller in the radially outward direction. Because the widths of the oil passages at the outer circumferential edges of the clutch discs have radially narrowed, the oil flowing into the passages tends to stay in the passages for a longer period of time, creating some hydrostatic pressure, dependent on the centrifugal force. Thus, the clutch discs are cooled and hydrostatic assistance is provided for separating the clutch discs and clutch plates away from each other. Other embodiments of friction facings in the '331 patent are shown of specific-type friction members. However, the common failing of all the designs of friction facings as shown in the '331 patent lies in their intricate shapes and designs which lead to manufacturing complexities, increased scrap production and the resultant concerns regarding proper disposal of the scrap. Further, the variety of facings disclosed in the '331 patent are all individually applicable to specific needs and types of applications for friction clutches and, generally speaking, cannot crossover in their intended uses. Therefore, it is an object of the invention to provide for friction facing segments which are nearly entirely scrapless in their manufacture.

It is another object of the invention to provide friction facing segments which are universally applicable to differing types of clutch usage.

It is yet another object of the present invention to provide friction facing segments which, depending upon their orientation when applied to the clutch disc or core, have divergent space between the segments.

Yet another object of the invention is to provide friction facing segments having structural advantages designated to produce or enhance oil flow through the spacing between the segments, such oil flow being dependent upon the direction of rotation of the disc.

Yet a further object of the invention is to produce a friction facing segment having a capability of maintaining static pressure and holding dynamic fluid flow within the spacing between the segments during operation of the engaged clutch disc and clutch plate.

Yet a further object of the invention is to provide for friction facing segments which, dependent upon their direction of rotation, will enhance the flow of oil into or the evacuation of oil from the friction facing.

DISCLOSURE OF INVENTION

A wet-type friction clutch plate is disclosed wherein the friction facing for the clutch discs is segmented and structured such that the manufacture of the facing segments is nearly entirely scrapless. The friction facing segments are oriented on the clutch plates so as to create desired lubrication and cooling pumping functions through oil channels created between the segments. The juxtaposition and orientation of the friction facing segments will achieve a desired direction of oil flow radially into or out of the friction disc and may also be used to create desired amounts of hydrostatic pressure between the discs and plates. The size of the universal segment, its shape, spacing and orientation all operate to control the degree of fluid pumping, hydrostatic pressure, and also the amount of cooling of the friction disc that can be accomplished.

An important criteria in determining the shape, spacing and orientation of the friction segments of this invention is the aspect ratio shape which provides an analysis of the friction surface area versus the coolant flow area. The aspect ratio compares the radial length of the friction segment with its annular width. For instance if segments are produced which have a long radial length and a short width, there will be a large number of oil grooves thereby allowing greater cooling of the clutch. This allows for greater heat generation and disruption within the clutch which is necessary to meet the performance standards for the higher RPM/smaller engines common to today's automobile. As the performance requirements become more stringent, the clutches must be able to provide high torque at high RPMs thereby operating efficiently at high temperatures. This performance requirement therefore demands more expensive, higher performance friction material for use as the friction facings. Thus, as the material costs increase, the present invention provides for friction facing segment designs which minimize the friction surface area while striving to maintain cooling and lubrication, in an effort to minimize material costs in today's clutches.

The variety of embodiments of the present invention will be more readily understood, in their application to the objectives of this invention by reference to the accompanying drawings and the following description of the preferred embodiments of the invention.

BRIEF DESCRIPTION OF THE DRAWINGS

FIG. 5 is a partial elevational view of a clutch disc having a fifth embodiment of the segmented friction facings of this invention;

FIG. 6 is a partial elevational view of a clutch disc having a sixth embodiment of the segmented friction facings of this invention;

FIG. 7 is a partial elevational view of a clutch disc having a seventh embodiment of the segmented friction facings of this invention;

BEST MODE OF CARRYING OUT INVENTION

Figure 1:
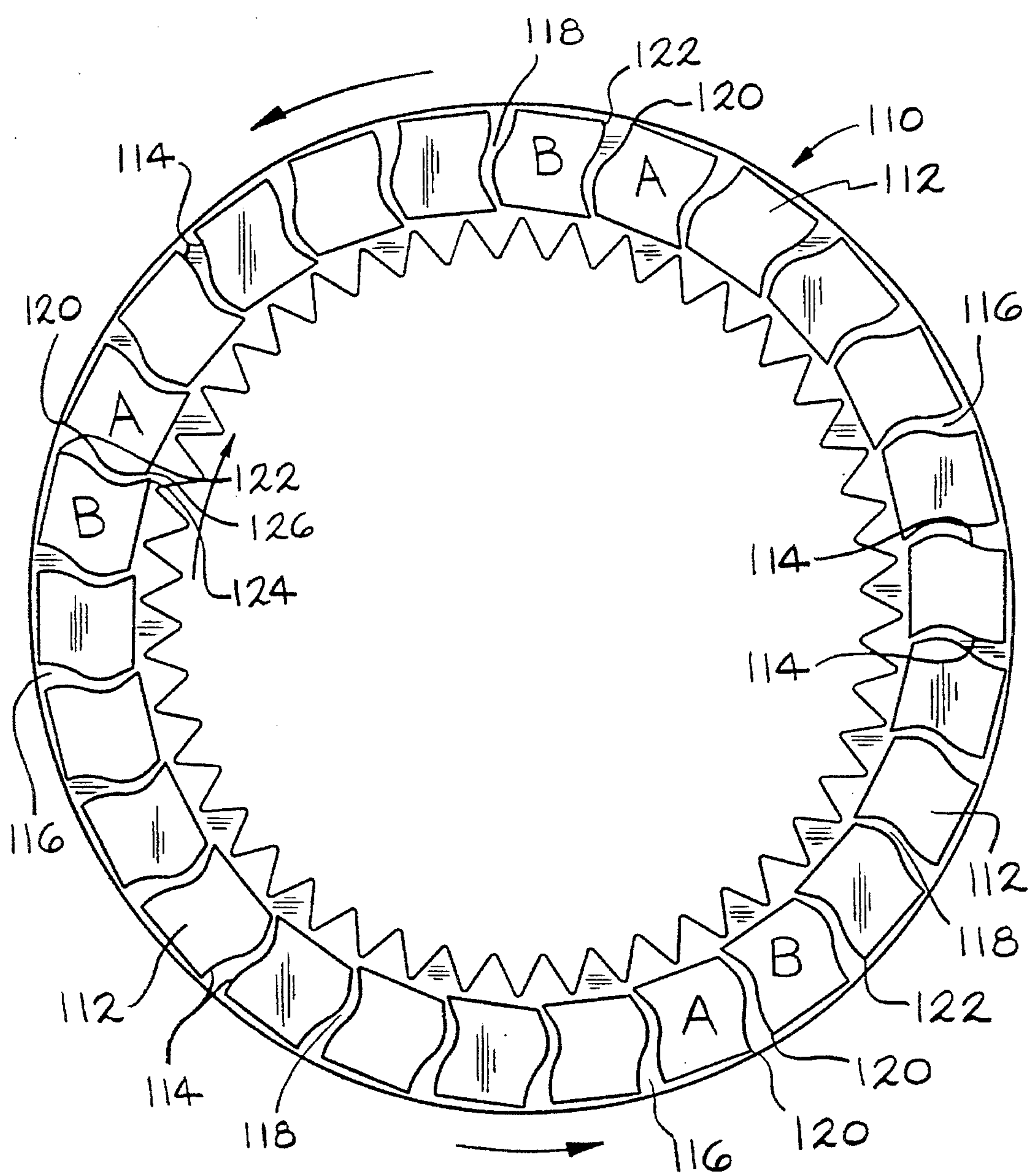
FIG. 1 is an elevational view of a clutch disc incorporating the friction facing segments of the present invention.

Referring now to FIG. 1, a friction disc 110 having the universal friction segments 112 of the present invention adhered thereto is shown. The identical friction segments 112 are produced from a continuous strip of friction facing material (not shown) such as a sintered metal or paper impregnated with a resin. The friction facing segments 112 are of a shape which is, preferably, die cut so as to use nearly all of the available friction facing material during the cutting process. The friction facing segments 112 of the embodiment shown in FIG. I are provided with curvilinear radial edges 114 which are configured to create desired fluid flow patterns in the gaps 116 located between the segments 112. For instance, on the friction segment orientation shown in FIG. 1, the curved area 118 of the gaps 116 provides for impedance of the flow of the fluid or oil which must be overcome as the oil flows through the gaps 116 as the result of centrifugal forces created by the rotation of the disc 110. The curvilinear gap 116, thus, will create hydrostatic pressure in the curved area 118 as the fluid flows through the gap 116. This pressurehead in the curved area 118 is intended to assist in separating the clutch plates and discs upon release of the clutch and will also act to eliminate parasitic drag when the plates are released and separated. The friction segments 112 can be oriented so that, for instance, edge 120 of segment A is angled slightly radially outward of edge 122 of segment B, the segment immediately preceding segment A so that edge 120 can be used as a scoop to pump fluid into the gap area 116 as the disc is rotated in the counterclockwise direction. Finally, if the disc is rotated in the clockwise direction and if edge 124 of segment B is oriented slightly radially inward of edge 126 of segment A, the edge 124 will scoop fluid into the gap 116 to evacuate radially outward.

Figure 2:
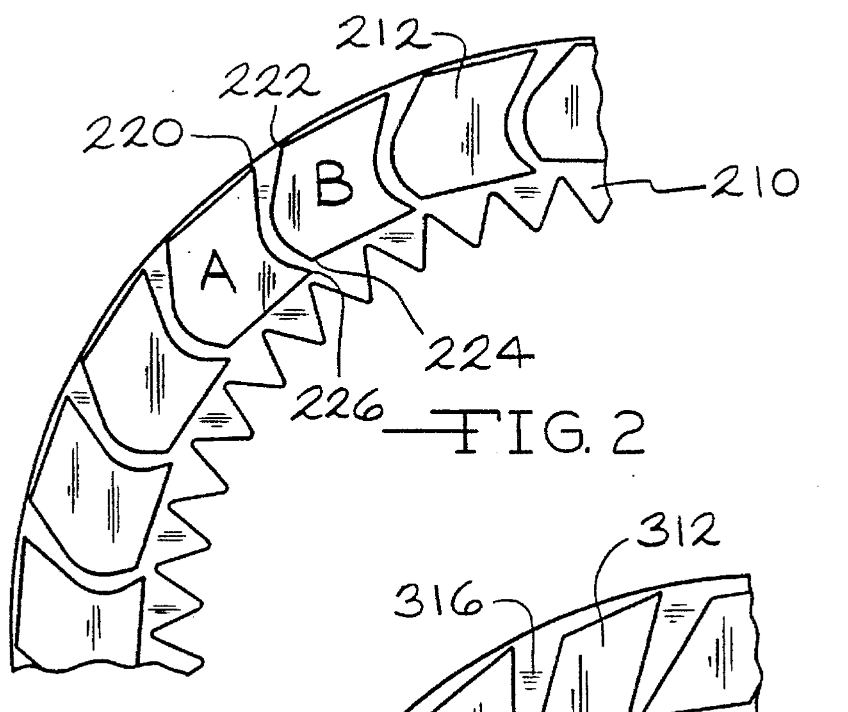
FIG. 2 is a partial elevational view of a clutch disc with an alternative embodiment of the segmented friction facings of this invention.

Referring now to FIG. 2, an alternative embodiment of the friction segment of FIG. 1 is shown wherein the curvature of the segments 212 include curvilinear radial edges 214 which are exaggerated over that shown in the segment 112 of FIG. 1. The curvilinear radial edges 214 are thus configured to create a curved area 218 that is an exaggerated replica of the curved area 118 found in the first embodiment. The pressure created in the curved area 218 of the gap 216 is greater as a result of the larger curve. Again, the segments 212 are die cut from a strip of friction material (not shown) leaving little or no scrap. The segments 212 are oriented on the disc 210 to provide the appropriate pumping action to press fluid through the gap 216 located between the segments 212, thereby creating a pressurehead in the curved area 218 of the gap 216 that is utilized to eliminate parasitic drag and cause the clutch plates 210 to separate. The amount of angled orientation between the segments is determined by the amount of cooling fluid flow desired and the amount of pressure buildup desired. The embodiment of the friction facing segment 212 shown in FIG. 2 is easily adaptable to pumping oil radially inward or radially outward, depending on the orientation of the segments 212. For instance, if the disc is rotated in the clockwise direction and if edge 220 of segment A extends radially beyond the edge 222 of segment B, oil will be pumped radially inward on the disc, thus assisting in the creation of a pressurehead. However, if the disc is rotated in the clockwise direction and if edge 226 of segment A extends radially beyond edge 224 of segment B, oil will be pumped radially outward on the disc, thus rapidly evacuating fluid through the widening gap 216 and cooling the disc more rapidly and creating less pressure building in the gap 216.

Figure 3:
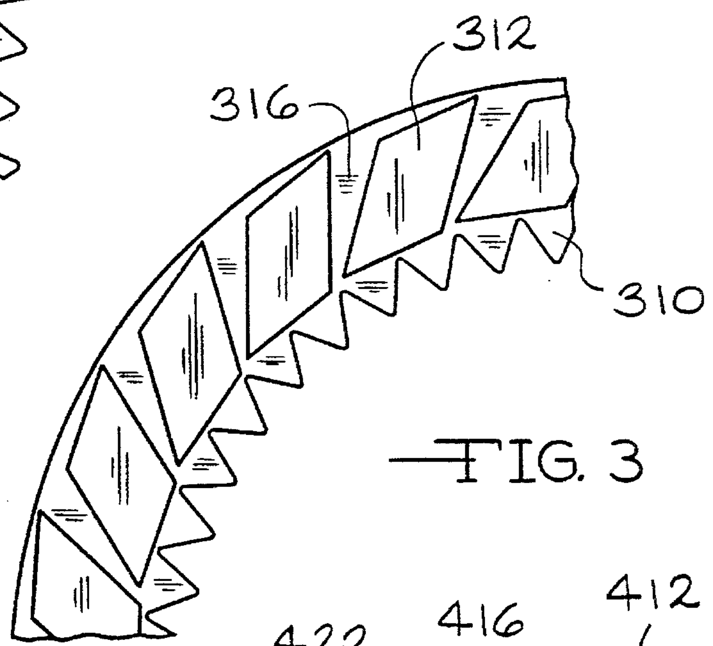
FIG. 3 is a partial elevational view of a clutch disc having a third embodiment of the segmented friction facings of this invention.

Referring now to FIG. 3, a third alternative embodiment of the invention is shown wherein the friction segments 312 are generally of a parallelogram shape. These friction segments 312 are die cut from a strip of friction material (not shown), leaving little or no scrap. The segments 312 are oriented on the disc in accordance with the specified desired fluid pumping and need for hydrostatic buildup. These friction segments 312 are less likely to produce a large pressure buildup in the gaps 316 between the segments 312 due to the lack of curvature. However, the orientation of the segments 312 will allow for the quick elimination of cooling oil from the gap 316 through the rapidly expanding gap 316 if the rotation is in the counterclockwise direction or may be utilized to build pressure within the rapidly narrowing gap 316 by forcing fluid into the narrowing gap 316 if the rotation is in the clockwise direction. Thus, the objectives of the invention are met by having a friction facing segment 312 which is universally applicable to any desired objective, depending upon its relative orientation and the direction of rotation of the disc.

Figure 4:
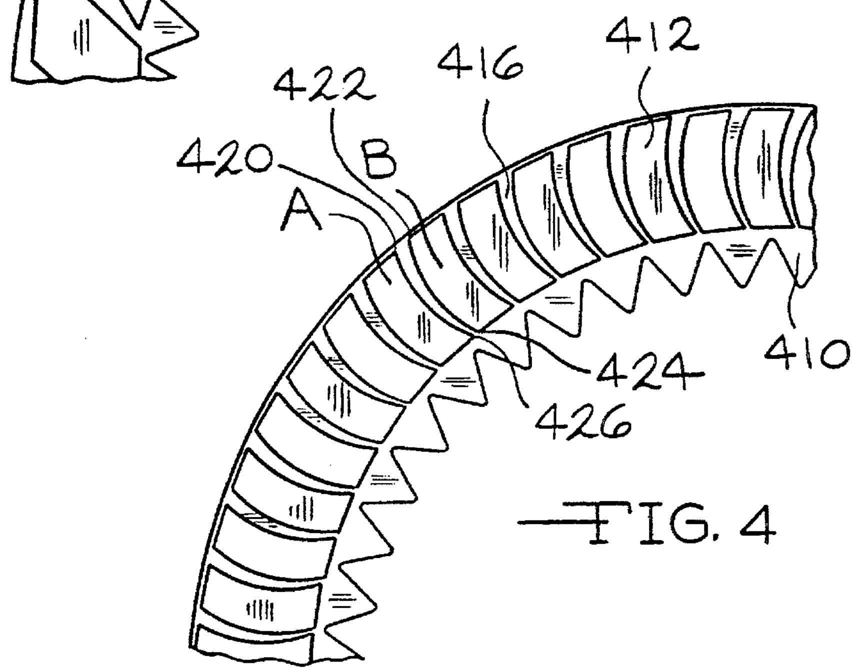
FIG. 4 is a partial elevational view of a clutch disc having a fourth embodiment of the segmented friction facings of this invention.

Referring now to FIG. 4, a fourth alternative embodiment of the invention is shown wherein the friction facing segments 412 are equally arcuate along the radial line providing curved gaps 416 therebetween. The segments 412 are die cut from a strip of friction material (not shown) leaving little or no scrap. The segments 412 are oriented on the disc 410 to provide the appropriate pumping action to press fluid through the gap 416 located between the segments 412. Again, depending upon the orientation of the segments 412, the oil is pumped radially inward or radially outward. For instance, if the disc is rotated in a clockwise direction and if edge 420 of segment A extends radially beyond the edge 422 of segment B, oil will be pumped radially inward on the disc, thus assisting in creating a pressurehead due to the slight narrowing of the gap 416. However, if the disc is rotated in the clockwise direction and if edge 426 of segment A extends radially beyond edge 424 of segment B, oil will be pumped radially outward on the disc, thus rapidly evacuating the fluid and cooling the disc more rapidly and creating less pressure buildup in the gap 416.

Referring now to FIG. 5, a friction disc 510 is shown which meets the objective of the present invention and is more suitable toward building pressure in the gap 516 between the friction segments 512. The segments 512 of FIG. 5 are similar in structure to the embodiments shown in FIGS. 1 and 2, however, they include a fairly exaggerated curvilinear gap 516 with little or no expansion of the gap 516 width along its radial length. The fluid flow will slow around the curved portion 518 of the gap 516, thereby creating a pressure buildup. The configuration of the edges of the segments 512 and the commonality of the width of the gap leads to a lesser degree of pumping action than that achieved by the embodiments shown in FIGS. 1 and 2. Therefore, the embodiment of friction facing segments 512 shown in FIG. 5 is more likely to induce high pressure buildup and less likely to induce high fluid flow rates, for cooling, through the gaps 516.

Referring now to FIG. 6, an embodiment of the friction facing segment 612 is shown wherein the largest expanded portion of the gap 616 is centered and has narrowing characteristics on the inner and outer radial edges of the gap 616. Again, the segments 612 are die cut from a strip of friction material (not shown) leaving little or no scrap. These segments 612 are preferably oriented on the disc to provide for a relatively large amount of hydrostatic pressure buildup and involve little or no pumping and cooling action through the gap 616. However, the segments 612 can be oriented to provide some inwardly directed or outwardly directed pumping action from a clockwise direction of rotation if desired.

Referring now to FIG. 7, the friction segments 712 are similar to those shown in FIG. 2 with the exception that the curved areas 718 of the gaps 716 are oriented in the reverse direction to those of the embodiments shown in FIG. 2. Thus, the pumping actions of the embodiment of FIG. 2 will be reversed and dependent upon the counterclockwise rotation of the disc. However, the ability to build a pressurehead in the gap area 716 remains similar to that of the embodiment shown in FIG. 2.

Figure 8:
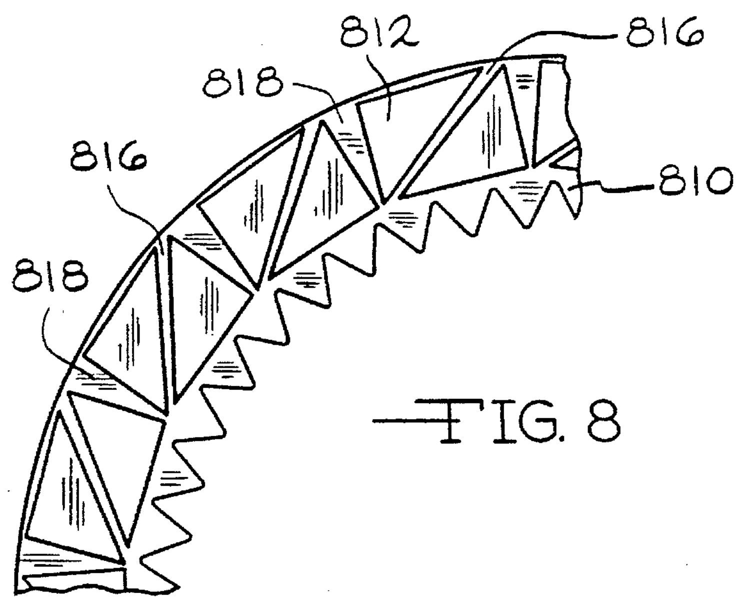
FIG. 8 is a partial elevational view of a clutch disc having an eighth embodiment of the segmented friction facings of this invention.

Referring now to FIG. 8, a scrapless friction segment 812 is shown utilizing triangle-shaped friction segments 812 oriented to produce two distinct robust groove patterns. As the disc 810 is rotated in a clockwise direction, cooling fluid flow will be pumped rapidly through grooves 816 while a pressurehead buildup will be simultaneously experienced in grooves 818 due to oil being pumped into the radially narrowing groove 818.

Figure 9:
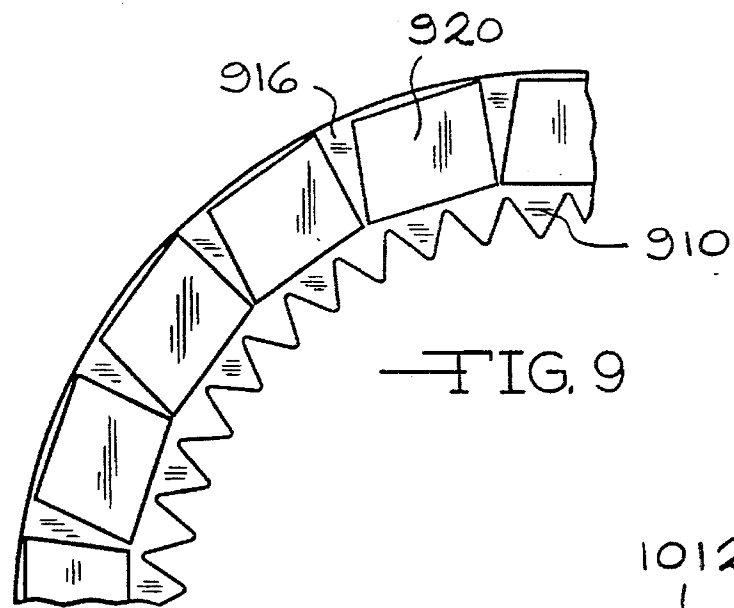
FIG. 9 is a partial elevational view of a clutch disc having a ninth embodiment of the segmented friction facings of this invention.

Referring now the FIG. 9, a scrapless friction segment 912 is shown that is similar in shape to the embodiment of FIG. 3. The segment 912, however, has an aspect ratio which produces a larger amount of frictional surface area than the embodiment of FIG. 3. Since there is more friction area there will be less cooling fluid flow through the grooves or gaps 916.

Figure 10:
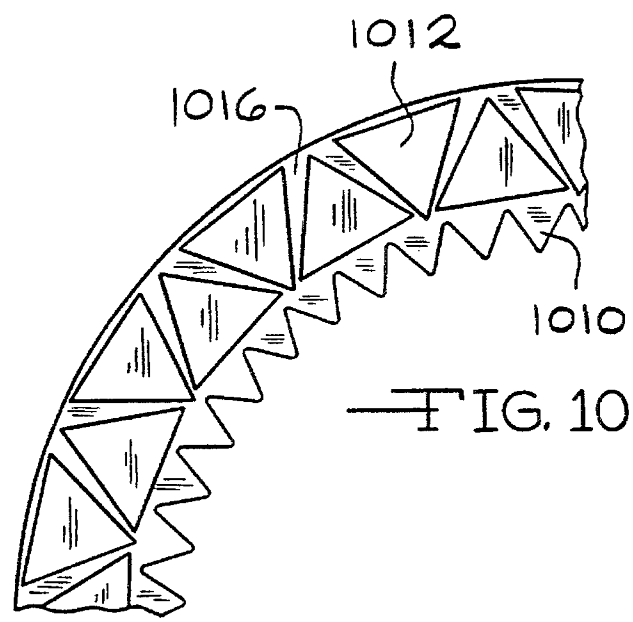
FIG. 10 is a partial elevational view of a clutch disc having a tenth embodiment of the segmented friction facings of this invention.

Referring now to FIG. 10, a scrapless friction segment 1012 is shown which has a similar aspect ratio to that segment embodied in FIGS. 3 and 9. However, the use of triangle shapes rather than parallelograms offers more gaps or grooves 1016 through which cooling fluid flow is directed.

The above present discussion of embodiments of the present invention is intended to be illustrative of the variety of embodiments available to meet the objectives of the present invention. The embodiments so disclosed are discussed is not intended to be solely limiting upon the scope and content of the following claims.

I claim:

1. A friction disc for use with a wet-type multi-plate clutch with cooling fluid for selectively transmitting driving forces from an engine to a road wheel comprising:

an annular core plate having opposed flat annular surfaces; and, a plurality of friction segments adhered to said opposed flat surfaces and spaced at predetermined intervals, said friction segments defining discrete friction surfaces and gaps located between said discrete friction surfaces, said friction segments having a generally triangular shape and said gaps between said triangular friction segments are alternating between a generally straight gap formed by generally parallel edges of said friction segments and radially expansive gaps in the outward direction, said friction segments being juxtaposed such that cooling fluid flows at a desired rate and in a desired direction as said friction disc rotates and further to effect the development of a desired level of hydrostatic pressure between adjacent friction discs within said clutch, wherein the relative juxtaposition of said friction segments effects desired alterations in the rate of cooling fluid flow through said gap.

2. The friction disc of claim 1, whereby rotation of said disc in one direction creates a full flow of cooling fluid through said gaps and rotation of said disc in the opposed direction creates cooling fluid flow through said parallel gaps and cooling fluid flow impedance in said expansive gaps to create required hydrostatic pressure.

3. A friction disc for use with a wet-type clutch with cooling fluid, comprising:

an annular core plate having opposed annular surfaces; and a plurality of discrete friction segments affixed to at least one surface of said core plate at spaced intervals, each of said friction segments being formed from a continuous strip of friction material and having a triangular shape, each of said segments defining a discrete friction surface and having at least one edge positioned proximate an edge of an adjacent segment, wherein said edge positioned proximate an edge of an adjacent segment of each of said friction segments as affixed to the annular surface defines a gap with said adjacent edge of an adjacent friction segment, said gaps between said triangular friction segments alternating in shade between a generally straight gap and a generally radially expensive gap in the outward direction.

4. The friction disc of claim 3, wherein said gaps defined by adjacent friction segments provide fluid flow therethrough at a desired rate and in a desired direction as said friction disc rates to effect cooling of said friction disc and further to effect the development of a desired level of hydrostatic pressure between adjacent friction discs, wherein such rate and direction of fluid flow through said gap and the level of hydrostatic pressure created in said gap are variable and dependent upon the relative juxtaposition of said friction segments on said annular core plate.

* * * * *